United States Patent
Kissa

(10) Patent No.: US 7,522,164 B2
(45) Date of Patent: Apr. 21, 2009

(54) USING SELF-ADJUSTABLE THREE-DIMENSIONAL MATRIX TO SIMPLIFY THE CONSTRUCTION OF A COMPLEX 3D SCENE

(75) Inventor: Peter Kissa, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 11/390,688

(22) Filed: Mar. 28, 2006

(65) Prior Publication Data
US 2007/0229550 A1 Oct. 4, 2007

(51) Int. Cl.
G06T 17/00 (2006.01)

(52) U.S. Cl. .................. 345/420; 345/419; 345/424; 345/427

(58) Field of Classification Search .................. 345/419, 345/424, 427, 582, 649, 653, 420
See application file for complete search history.

(56) References Cited

U.S. PATENT DOCUMENTS

| | | | |
|---|---|---|---|
| 5,265,197 A | | 11/1993 | Kondo |
| 5,299,297 A | * | 3/1994 | Reynolds et al. ............ 345/421 |
| 5,742,294 A | | 4/1998 | Watanabe |
| 5,923,575 A | | 7/1999 | Hatanaka |
| 6,014,143 A | | 1/2000 | Naqvi et al. |
| 6,377,285 B1 | * | 4/2002 | Doan et al. .................. 715/764 |
| 6,400,373 B1 | | 6/2002 | Uchiyama et al. |
| 6,515,663 B1 | | 2/2003 | Hung et al. |
| 6,570,952 B2 | | 5/2003 | Paladini |
| 2001/0015728 A1 | | 8/2001 | Fujiwara et al. |
| 2003/0179204 A1 | | 9/2003 | Mochizuki et al. |
| 2003/0184542 A1 | | 10/2003 | Yamamoto |
| 2005/0151734 A1 | | 7/2005 | Gubkin et al. |

FOREIGN PATENT DOCUMENTS

JP 08-287287 11/1996

OTHER PUBLICATIONS

Wang et al., "Shape Simplification of Free-Form Surface Objects for Multi-Scale Representation", IEEE International conference on Systems, Man, and Cybernetics, 1996, vol. 3, pp. 1623-1628.
Breen et al., "A Level-Set Approach for the Metamorphosis of Solid Models", IEEE Transactions on Visualization and Computer Graphics, vol. 7, Issue 2, Apr.-Jun. 2001, pp. 173-192.

* cited by examiner

Primary Examiner—Xiao M Wu
Assistant Examiner—Abderrahim Merouan
(74) Attorney, Agent, or Firm—Yee & Associates, P.C.; Jill A. Poimboeuf

(57) ABSTRACT

The aspects of the present invention provide for a computer implemented method, apparatus, and computer usable program code for adding a new virtual object into a virtual scene having at least one existing virtual object. An exemplary computer-implemented method includes calculating the dimensions for each cell in a matrix that defines the virtual scene. The dimensions used to fit a largest retained virtual object are propagated along all dimensions of the matrix, wherein the largest retained virtual object is a virtual object selected from the group consisting of the new virtual object and an object from at least one of the existing virtual objects, thereby adjusting the dimensions of the matrix to form a modified matrix. All the existing virtual objects, including the new one, are properly positioned within the modified matrix.

2 Claims, 6 Drawing Sheets

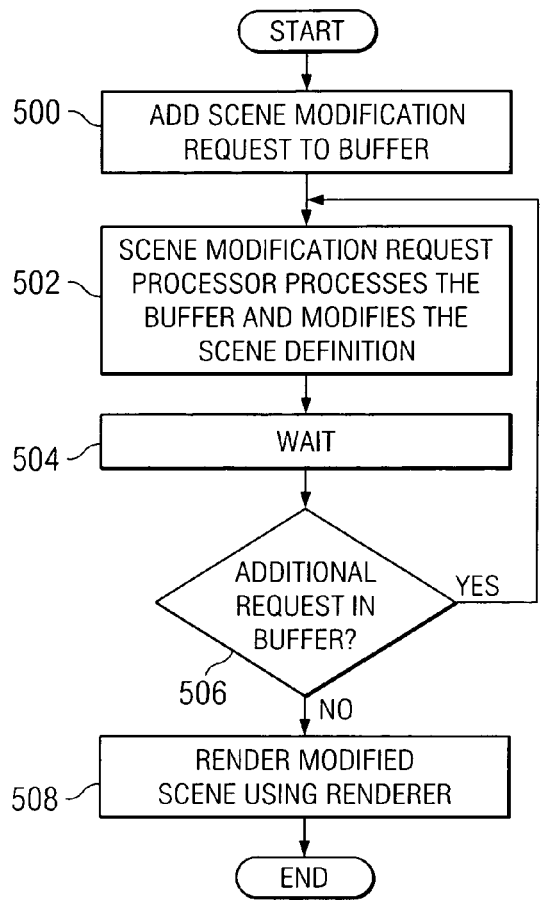
FIG. 5
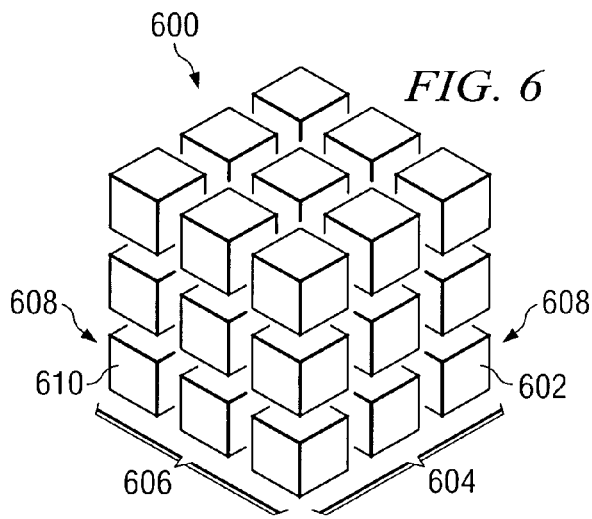
FIG. 6
FIG. 9
```
1   < ! ELEMENT matrix (layer*) >
2   < ! ELEMENT layer (lr*) >
3   < ! ELEMENT lr (ld+) >
4   < ! ELEMENT ld (%shapes;) >
5   < ! ATTLIST ld
6     align   (left | center | right) #IMPLIED
7     valign  (top | center | bottom) #IMPLIED
8     zalign  (front | center | back) #IMPLIED
```

```
1    <scene>
2        <matrix>
3            <layer>
4                <lr>
5                    <ld><cube size="5"/></ld>
6                    <ld><cube size="5"/></ld>
7                    <ld><cube size="5"/></ld>
8                </lr>
9                <lr>
10                   <ld><cube size="5"/></ld>
11                   <ld><cube size="5"/></ld>
12                   <ld><cube size="5"/></ld>
13               </lr>
```

FROM FIG. 8A

```
14          <lr>
15                  <ld><cube size="5"/></ld>
16                  <ld><cube size="5"/></ld>
17                  <ld><cube size="5"/></ld>
18          </lr>
19      </layer>
20      <layer>
21          <lr>
22                  <ld><cube size="5"/></ld>
23                  <ld><cube size="5"/></ld>
24                  <ld><cube size="5"/></ld>
25          </lr>
26          <lr>
27                  <ld><cube size="5"/></ld>
28                  <ld><cube size="20"/></ld>
29                  <ld><cube size="5"/></ld>
30          </lr>
31          <lr>
32                  <ld><cube size="5"/></ld>
33                  <ld><cube size="5"/></ld>
34                  <ld><cube size="5"/></ld>
35          </lr>
36      </layer>
37      <layer>
38          <lr>
39                  <ld><cube size="5"/></ld>
40                  <ld><cube size="5"/></ld>
41                  <ld><cube size="5"/></ld>
42          </lr>
43          <lr>
44                  <ld><cube size="5"/></ld>
45                  <ld><cube size="5"/></ld>
46                  <ld><cube size="5"/></ld>
47          </lr>
48          <lr>
49                  <ld><cube size="5"/></ld>
50                  <ld><cube size="5"/></ld>
51                  <ld><cube size="5"/></ld>
52          </lr>
53      </layer>
54    </matrix>
55  </scene>
```

FIG. 10

```
1  <matrix>
2  <layer>
3      <lr>
4          <ld><cuboid size="5" width="20" depth="5"/></ld>
5          <ld><cuboid size="5" width="20" depth="5"/></ld>
6      </lr>
7      <lr>
8          <ld align="right"><cube size="5"/></ld>
9          <ld align="left"><cube size="5"/></ld>
10     </lr>
11     <lr>
12         <ld><cuboid size="5" width="20" depth="5"/></ld>
13         <ld><cuboid size="5" width="20" depth="5"/></ld>
14     </lr>
15 </layer>
16 <layer>
17     <lr>
18         <ld><cube size="5"/></ld>
19         <ld><cube size="5"/></ld>
20     </lr>
21     <lr>
22         <ld align="right"><sphere size="5"/></ld>
23         <ld align="left"><sphere size="5"/></ld>
24     </lr>
25     <lr>
26         <ld><cube size="5"/></ld>
27         <ld><cube size="5"/></ld>
28     </lr>
29 </layer>
30 <layer>
31     <lr>
32         <ld><cuboid height="5" width="20" depth="5"/></ld>
33         <ld><cuboid height="5" width="20" depth="5"/></ld>
34     </lr>
35     <lr>
36         <ld align="right"><cube size="5"/></ld>
37         <ld align="left"><cube size="5"/></ld>
38     </lr>
39     <lr>
40         <ld><cuboid height="5" width="20" depth="5"/></ld>
41         <ld><cuboid height="5" width="20" depth="5"/></ld>
42     </lr>
43 </layer>
44 </matrix>
```

USING SELF-ADJUSTABLE THREE-DIMENSIONAL MATRIX TO SIMPLIFY THE CONSTRUCTION OF A COMPLEX 3D SCENE

BACKGROUND OF THE INVENTION

1. Field of the Invention

The aspect of the present invention relates generally to computer software and in particular techniques for constructing virtual scenes. Still more particularly, aspects of the present invention relate to a computer implemented method, apparatus, and computer usable program code for efficient virtual scenes management, where the virtual objects can be added, modified or deleted.

2. Description of the Related Art

Computers can be used to render three-dimensional scenes known as virtual scenes. For example, a three-dimensional virtual scene could be a forest, where each tree, as a virtual object, is placed somewhere within the three-dimensional scene.

The complexity of the construction of a three-dimensional scene increases with the number of the virtual objects to be rendered in the scene. Continuing the above example, a forest that contained many trees can be quite complex. Usually, the virtual objects are organized within some meaningful and well-structured form, such as a matrix. This matrix contains data corresponding to the virtual objects and/or parts of the virtual objects in the virtual scene or some other native object model.

All known solutions which provide an application program interface for building three-dimensional scenes expose the whole native object model with all of its complexity. Known solutions do not provide the encapsulation of its application program interface which would simplify the construction of a three-dimensional scene. Therefore, working with the known solutions, one cannot efficiently construct three-dimensional virtual scenes.

SUMMARY OF THE INVENTION

The aspects of the present invention provide for a computer implemented method, apparatus, and computer usable program code for adding a new virtual object into a virtual scene having at least one existing virtual object. An exemplary computer-implemented method includes calculating the dimensions for each cell in a matrix that defines the virtual scene. The dimensions used to fit a largest retained virtual object are propagated along all dimensions of the matrix. The largest retained virtual object is a virtual object selected from the group consisting of the new virtual object and an object from at least one of the existing virtual objects. Thus, the dimensions of the matrix are adjusted to form a modified matrix. The new virtual object and all existing virtual objects are positioned into the modified matrix.

BRIEF DESCRIPTION OF THE DRAWINGS

The novel features believed characteristic of aspects of the invention are set forth in the appended claims. The aspects of the invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a method for processing requests for scene modification of a virtual scene, in accordance with an illustrative example of the an aspect of the present invention;

FIG. 6 is a virtual scene of a three dimensional grouping of cubes, in accordance with an illustrative example of the aspects of the present invention;

FIG. 7 is a virtual scene of a three dimensional grouping of cubes, in accordance with an illustrative example of the aspects of the present invention;

FIGS. 8A and 8B show pseudo-code implementing a flexible three-dimensional matrix structure, in accordance with an illustrative example of an aspect of the present invention;

FIG. 9 shows pseudo-code that defines a three-dimensional matrix used as the template, in accordance with an illustrative example of the aspects of the invention;

FIG. 10 shows pseudo-code implementing a flexible three-dimensional matrix structure, in accordance with an illustrative example of the aspects of the present invention.

DETAILED DESCRIPTION OF THE PREFERRED EMBODIMENT

Figure 1:
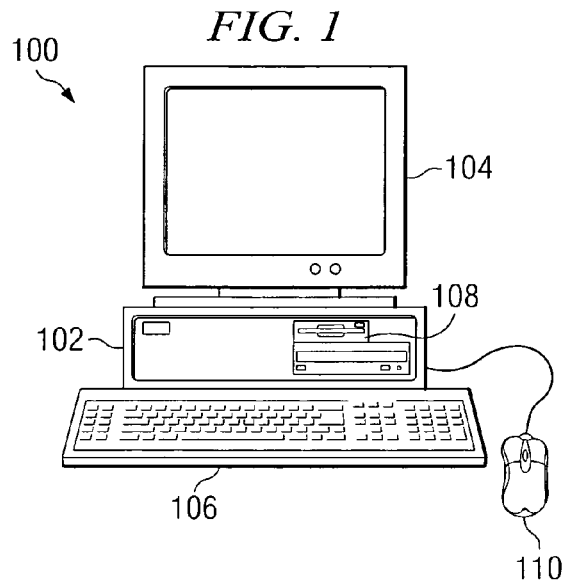
FIG. 1 is a pictorial representation of a data processing system in which the aspects of the invention may be implemented.

With reference now to the figures and in particular with reference to FIG. 1, is a pictorial representation of a data processing system in which the aspects of the invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the invention may be implemented in other types of data processing systems, such as a network computer. Computer 100 also preferably includes a graphical user interface (GUI) that may be implemented by means of systems software residing in computer readable media in operation within computer 100.

Figure 2:
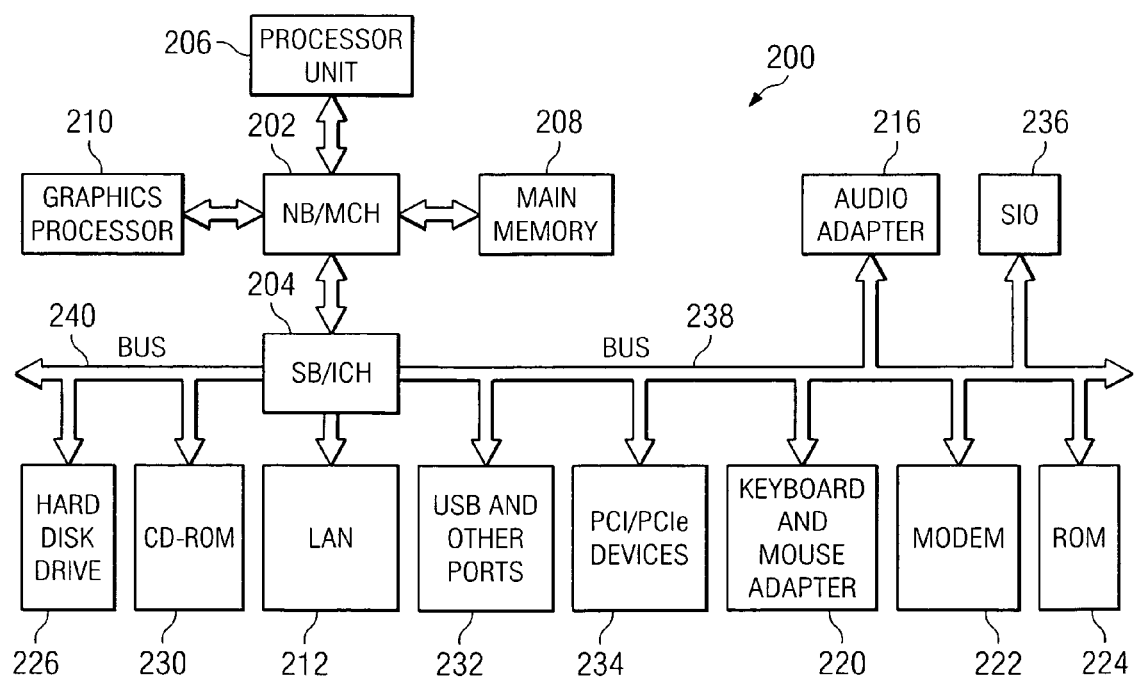
FIG. 2 is a block diagram of a data processing system in which aspects of the invention may be implemented.

With reference now to FIG. 2, is a block diagram of a data processing system in which aspects of the invention may be implemented. Data processing system 200 is an example of a computer, such as computer 100 in FIG. 1, in which code or instructions implementing the processes of the invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the aspects of the invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the aspects of the invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the invention provide for a computer implemented method, apparatus, and computer usable program code for compiling source code. The methods of the invention may be performed in a data processing system, such as data processing system 100 shown in FIG. 1 or data processing system 200 shown in FIG. 2.

The aspects of the invention provide for a computer implemented method, apparatus, and computer usable program code for adding a new virtual object to a virtual scene having at least one existing virtual object. A flexible three-dimensional matrix structure allows a new object to be easily inserted into an existing virtual scene in such a way that all virtual objects added to the matrix are properly aligned within the cells of the matrix, following the given alignment rule sets.

An exemplary computer-implemented method includes calculating the dimensions for each cell in a matrix that defines the virtual scene. The dimensions used to fit a largest retained virtual object are propagated along all dimensions of the matrix. The largest retained virtual object is a virtual object selected from the group consisting of the new virtual object and an object from at least one of the existing virtual objects. Thus, the dimensions of the matrix are adjusted to form a modified matrix. The new virtual object and all existing virtual objects are positioned into the modified matrix.

Figure 3:
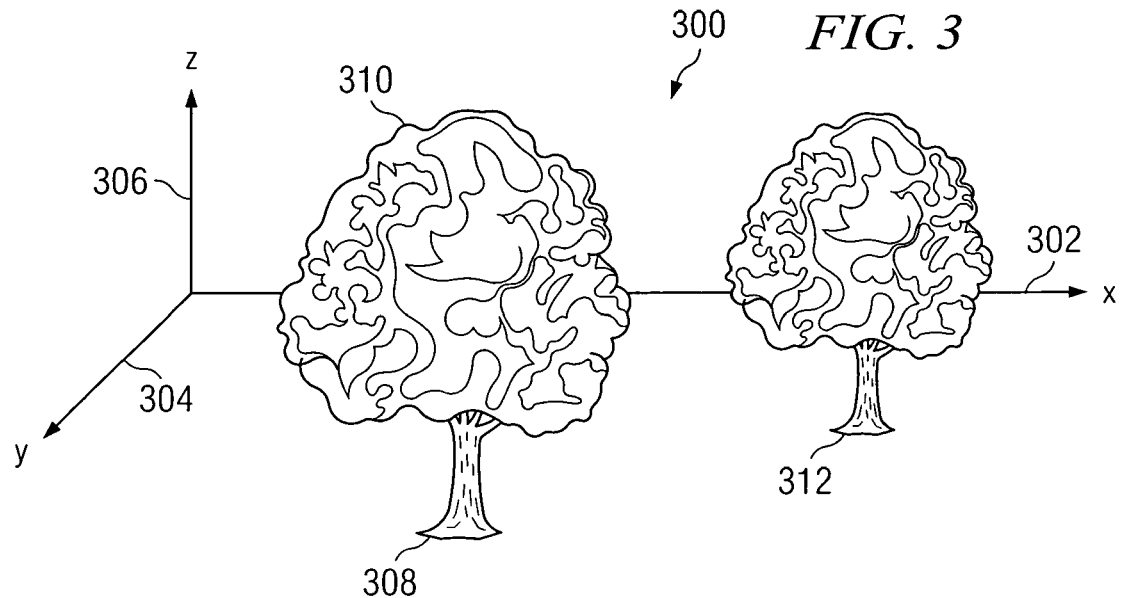
FIG. 3 shows a virtual scene, in accordance with an illustrative example of an aspect of the present invention.

FIG. 3 shows a virtual scene, in accordance with an illustrative example of an aspect of the present invention. Virtual scene 300 can be implemented in a data processing system, such as data processing system 100 shown in FIG. 1 or data processing system 200 shown in FIG. 2.

The position of objects within virtual scene 300 is defined by x-axis 302, y-axis 304, and z-axis 306. Virtual scene 300 includes a tree 308 having branch 310. Thus, for example, branch 310 can be defined by groups of three data points, with each set of three data points representing a location of a portion of branch 310. Together, the groups of three data points define the shape of branch 310. Branch 310 can, itself, be defined as an individual object within a three-dimensional matrix so that branch 310 is manipulated as a whole object. Additionally, tree 308 can be represented in a similar manner by defining another group of sets of three data points.

In other illustrative examples, sets of three data points can be replaced with sets of four data points, or sets of any desired number of data points. Additional data points can present other features of tree 308 or branch 310. For example, a fourth data point can represent color, a fifth data point can represent texture, a sixth data point can represent brightness, and additional data points can represent other aspects of a particular portion of branch 310 or any other part of tree 308.

The three-dimensional matrix structure, used for the definition of a virtual scene, includes a set of layers which split the matrix into a separate logical units along the z axis. Each such layer has a set of rows and columns, where the intersection of a row and a column forms a cell. The cell is an atomic unit of a matrix, such that a cell can be identified uniquely by layer identification, row number, and column number. Every virtual object is associated with a cell within the matrix, which defines the virtual scene. Each cell has its own alignment rule set, which determines how the associated virtual object will be aligned within the x, y and z axis of the cell. The appropriate alignment rule set values can be: left, center, and right for the x axis; top, center, and bottom for the y axis; and front, center, and back for the z axis.

The three-dimensional matrix structure that defines virtual scene 300 is modified such that a new virtual object being added fits into the cells with which they are associated. The fit into the cells is ensured by the fact that the largest retained visual object dictates the dimensions for all the related cells in the matrix. The renderer propagates these adjustments throughout the whole three-dimensional matrix by checking all the related cells of the matrix and performing the modifications, if needed. All the virtual objects of the matrix are also properly aligned within the cells following the given alignment rule sets defined for each cell. In this way, the three-dimensional scene is organized within a well-known structure which helps the user to navigate through the scene by recognizing the separate layers, rows, and cells of the matrix.

For example, a user desires to add tree 312, which is a new virtual object, to virtual scene 300. The user defines tree 312 and then causes tree 312 to be added to the three-dimensional matrix that defines virtual scene 300.

Although virtual scene 300 is described in relation to tree 308, branch 310, and tree 312 using x-axis 302, y-axis 304, and z-axis 306, virtual scene can be any desired virtual scene using any desired coordinate system. For example, virtual scene 300 can be replaced by a scene of a house defined by polar coordinates. Virtual scene 300 can also be replaced by a scene of an astronomical phenomenon defined by cylindrical coordinates. Additionally, virtual scene 300 can be a two-dimensional scene instead of a three-dimensional scene. Thus, virtual scene 300 can be any desired virtual scene defined by any desired coordinate system. The aspects of the present invention relating to defining a flexible matrix for efficient inclusion of additional virtual objects can be applied to any virtual scenes using any particular coordinate systems.

Figure 4:
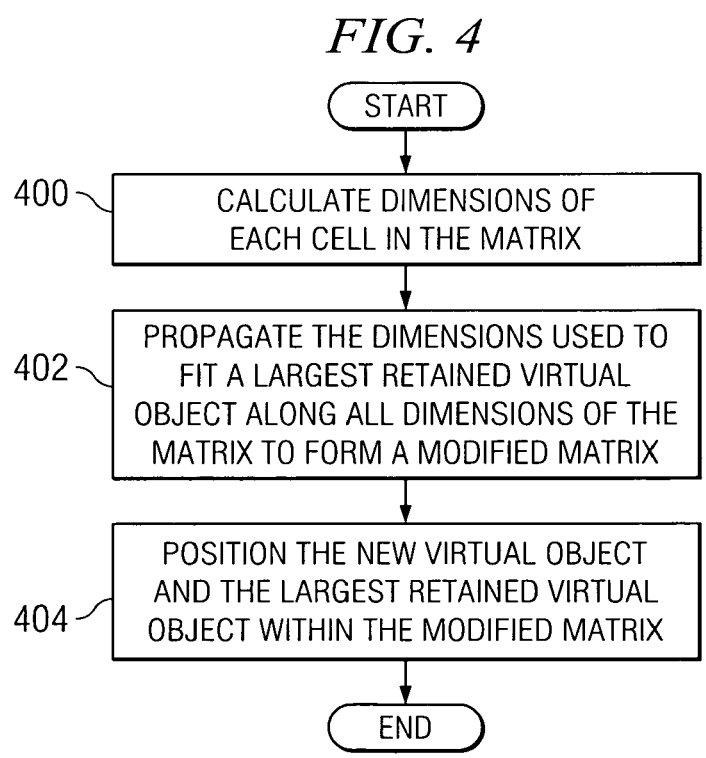
FIG. 4 is a flowchart describing inserting a new virtual object into a virtual scene, in accordance with an illustrative example of the aspects of the present invention.

FIG. 4 is a flowchart describing inserting a new virtual object into a virtual scene, in accordance with an illustrative example of the aspects of the present invention. The exemplary process described in FIG. 4 can be implemented in a data processing system, such as data processing system 100 shown in FIG. 1 or data processing system 200 shown in FIG. 2. The exemplary process described in FIG. 4 is implemented with respect to one or more virtual objects within a virtual scene. An example of a virtual scene is virtual scene 300 in FIG. 3. Examples of virtual objects include tree 308, branch 310, and tree 312.

Initially, a user or some computer process provides a matrix that defines a virtual scene. The user or some computer process also provides a new virtual object to be included in the virtual scene. The renderer, which is a program responsible for the construction of a virtual scene, calculates the dimensions of each cell in the matrix (step 400). The renderer then propagates the dimensions used to fit a largest retained virtual object along all dimensions of the matrix to form a modified matrix (step 402). Thus, if the matrix is a three dimensional matrix, then the renderer propagates the dimensions used to fit a largest retained virtual object along each of the three spatial dimension defined in the matrix. The renderer propagates the dimensions by checking all the cells of the matrix and performing the modifications to the cell dimensions if needed. The term "retained virtual object" is used because a user could also delete virtual objects from the virtual scene at the same time as adding a new virtual object. The size of the largest retained virtual object is used. In the context of this application, the term "size" of an object refers to how much space from a virtual scene should be allocated for the object to be fully visible.

Next, the renderer positions the new virtual object and the largest retained virtual object within the modified matrix (step 404). The term "positions" means that the renderer places a new virtual object within a virtual scene (and/or deletes an existing virtual object within a virtual scene) and also adjusts the positions of other virtual objects within the virtual scene to accommodate the change in the virtual scene. Thus, a modified virtual scene is formed. The modified matrix defining the modified virtual scene is the template for defining the modified virtual scene. The renderer positions all of the virtual objects into the modified matrix following the alignment rule sets. The process terminates thereafter.

FIG. 5 is a flowchart of a method for processing requests for scene modification of a virtual scene, in accordance with an illustrative example of the aspects of the present invention. The exemplary process described in FIG. 5 can be implemented in a data processing system, such as data processing system 100 shown in FIG. 1 or data processing system 200 shown in FIG. 2. The exemplary process described in FIG. 5 is implemented with respect to one or more virtual objects within a virtual scene. An example of a virtual scene is virtual scene 300 in FIG. 3. Examples of virtual objects include tree 308, branch 310, and tree 312.

The process begins as a scene modification program, other software, hardware, or a user adds a scene modification request to a buffer (step 500). A buffer can be volatile or non-volatile memory suitable for storing data and computer commands, such as a cache. A scene modification request is computer usable code or computer usable data for modifying a scene. In the example shown in FIG. 3, a scene modification request could be a request to add virtual tree 312 to virtual scene 300, where the scene modification request is generated by a scene modification program at the direction of a user.

After the scene modification request is added to the buffer, a scene modification request processor processes the buffer and modifies a scene definition (step 502). A scene modification request processor can be a processor in a data processing system or any software, hardware, or processor suitable for manipulating computer usable code and/or computer usable data. The scene modification request processor processes the buffer by analyzing a scene modification request in the context of an existing scene definition, if present. A scene definition defines the position and/or characteristics of one or more virtual objects within a virtual scene. The scene modification processor determines how a scene definition should be changed to accommodate the scene modification request. The scene modification processor then modifies the scene definition to accommodate the change required by the scene modification request. As a result, a modified scene definition is created.

Optionally, the scene modification processor can be programmed to wait for a user-defined or pre-defined amount of time before performing additional processing (step 504). By waiting the set time, time is allowed for additional scene modification requests to be entered into the buffer (step 500) and combined with the existing scene definition to create a new scene definition (step 502). Thus, more than one scene modification request can be rendered, as described below, at the same time. In another illustrative example, the scene modification processor is programmed to wait for the set amount of time for only a set number of cycles between steps 506 and 502. Thus, for example, the scene modification processor can be programmed to wait for five seconds one time and then automatically determine that no additional requests are present in the buffer, thereby automatically proceeding to step 508.

In any case, the scene modification processor determines whether additional scene modification requests are pending (step 506). If additional scene modification requests are pending, then the process returns to step 502, whereupon the scene modification processor processes the buffer and modifies the scene definition as described above. If no additional scene modification requests are pending, then the renderer renders the modified scene using the modified scene definition (step 508). An exemplary process of rendering a scene using a scene definition is described with respect to FIG. 4. The process terminates thereafter.

FIG. 6 is a virtual scene of a three dimensional grouping of cubes, in accordance with an illustrative example of the aspects of the present invention. Virtual scene 600 can be implemented in a data processing system, such as data processing system 100 shown in FIG. 1 or data processing system 200 shown in FIG. 2. Virtual scene 600 is similar to virtual scene 300 in that virtual scene 300 shown in FIG. 3 can be replaced with virtual scene 600 shown in FIG. 6. Therefore, the description relating to FIG. 3 also applies to FIG. 6.

Virtual scene 600 includes a group of virtual objects which, in this example, are cubes, such as cube 602. Virtual scene 600 includes three rows, such as row 604, three columns, such as column 606, and three layers, such as layer 608. Layer 608 includes all virtual cubes included in row 604, column 606, and all virtual cubes lying in about the same plane in which both cube 602 and cube 610 lie. In exemplary virtual scene 600, no virtual cube is present in row 2, column 2, layer 2. In other words, no virtual cube is present in the center of virtual scene 600.

In this illustrative example, a user desires to add a cube to virtual scene 600 at row 2, column 2, layer 2, or to add a cube to the center of virtual scene 600. However, the new cube is to be four times the size of the other cubes in virtual scene 600, such as cube 602 and cube 610.

Figures 7, 8A:
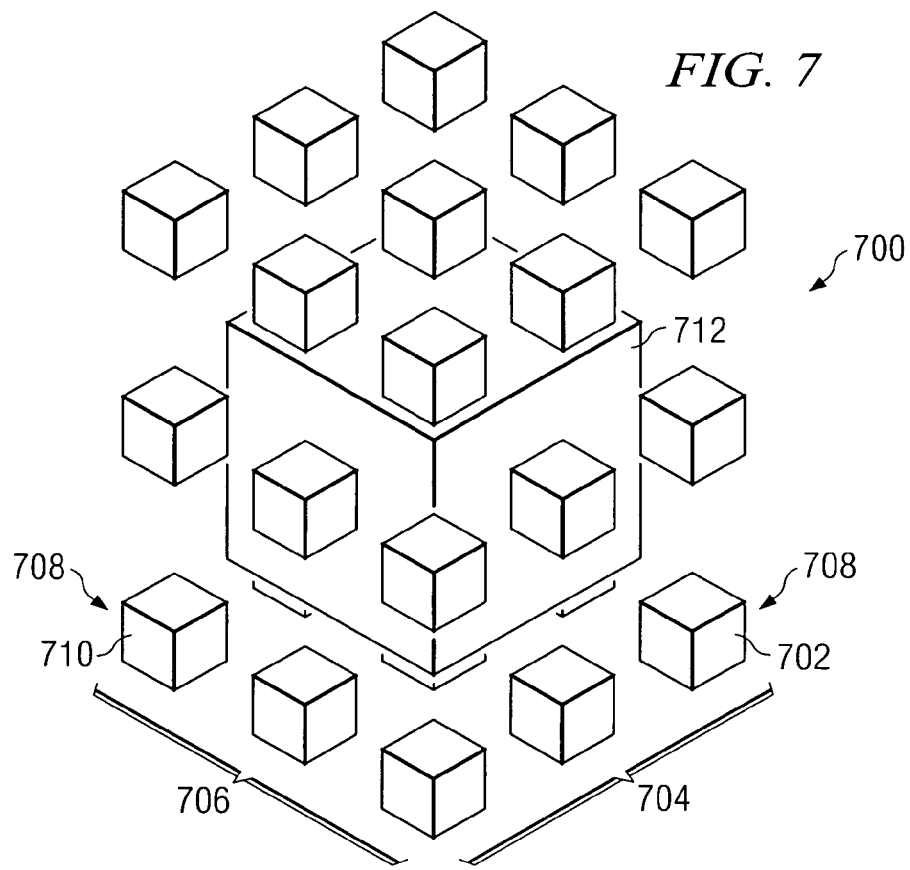

FIG. 7 is a virtual scene of a three dimensional grouping of cubes, in accordance with an illustrative example of the aspects of the present invention. Virtual scene 600 can be implemented in a data processing system, such as data processing system 100 shown in FIG. 1 or data processing system 200 shown in FIG. 2. Virtual scene 600 is similar to virtual scene 300 in that virtual scene 300 shown in FIG. 3 can be replaced with virtual scene 600 shown in FIG. 6. Therefore, the description relating to FIG. 3 also applies to FIG. 6.

Virtual scene 700 corresponds to virtual scene 600. Thus, reference numeral 700 in FIG. 7 corresponds to reference numeral 600 in FIG. 6. Similarly, reference numeral 702 corresponds to reference numeral 602, reference numeral 704 corresponds to reference numeral 604, reference numeral 706 corresponds to reference numeral 606, reference numeral 708 corresponds to reference numeral 608, and reference numeral 710 corresponds to reference numeral 610. However, in FIG. 7, cube 712 is added to the position corresponding to row 2, column 2, layer 2. Thus, cube 712 fills the empty space in the middle of virtual scene 600 in FIG. 6.

As can be seen in FIG. 7, cube 712 is much larger than the other cubes in virtual scene 700. In the illustrative example, cube 712 is four times larger in each dimension than cube 702 or cube 710. Thus, in order to position cube 712 in virtual scene 700, the position of the remaining cubes in virtual scene 700, such as cube 702 and cube 710, must be adjusted within virtual scene 700.

In the illustrative example, virtual scene 700 is automatically adjusted to accommodate cube 712 according to the methods described vis-à-vis FIG. 3 through FIG. 5. As is apparent in FIG. 7, the alignment rule set in this illustrative example provides that the remaining cubes be positioned evenly relative to each other while still accommodating cube 712. Thus, cube 712 is effectively positioned within virtual scene 700. An example of computer usable program code for performing the repositioning of cubes within virtual scene 700 is shown in FIGS. 8A and 8B.

FIGS. 8A and 8B show pseudo-code implementing a flexible three-dimensional matrix structure, in accordance with an illustrative example of an aspect of the present invention. The pseudo-code shown in FIGS. 8A and 8B can be executed in a data processing system, such as data processing system 100 shown in FIG. 1 or data processing system 200 shown in FIG. 2.

The pseudo-code shown in FIGS. 8A and 8B is an example of how a flexible matrix structure can be implemented. The pseudo-code shown in FIGS. 8A and 8B is particularly applicable to adding cube 712 in FIG. 7 to virtual scene 600 shown in FIG. 6. However, the pseudo-code shown in FIGS. 8A and 8B can be adjusted such that the pseudo-code is applicable to virtual scene 300 in FIG. 3 or to any other virtual scene.

FIG. 9 shows pseudo-code that defines a three-dimensional matrix used as the template, in accordance with an illustrative example of an aspect of the present invention. The pseudo-code shown in FIG. 9 can be executed in a data processing system, such as data processing system 100 shown in FIG. 1 or data processing system 200 shown in FIG. 2. The pseudo-code shown in FIG. 9 is particularly applicable to a virtual scene having one or more virtual blocks and/or one or more virtual spheres, such as those shown in FIG. 6 and FIG. 7. Although virtual scene 300 shown in FIG. 3 shows virtual objects in the form of tree 308 and tree 312, these virtual objects can be replaced by virtual blocks and/or virtual spheres and still form a virtual scene as described with respect to FIG. 3. Thus, the pseudo-code shown in FIG. 9 is applicable to virtual scene 300 in FIG. 3.

The pseudo-code shown in FIG. 9 describes a stripped-down document type definition (DTD). The document type definition defines the three-dimensional matrix used as the template, where the element 'layer' represents the layer of a matrix, 'lr' represents the row and 'ld' represents the cell. The model also prescribes the relationships between the layer, row and the cell, where the matrix can have multiple layers, a layer can have multiple rows, a row can have multiple cells and a cell can be associated with a virtual object, which is noted as a shape. The model also imposes the values for the cell's alignment rule set.

FIG. 10 shows pseudo-code implementing a flexible three-dimensional matrix structure, in accordance with an illustrative example of the aspects of the present invention. The pseudo-code shown in FIG. 9 can be executed in a data processing system, such as data processing system 100 shown in FIG. 1 or data processing system 200 shown in FIG. 2.

The pseudo-code shown in FIG. 10 is an example of how a flexible matrix structure can be implemented. The pseudo-code shown in FIG. 10 is particularly applicable to a virtual scene having one or more virtual blocks and/or one or more virtual spheres. Although virtual scene 300 shown in FIG. 3 shows virtual objects in the form of tree 308 and tree 312, these virtual objects can be replaced by virtual blocks and/or virtual spheres (such as those shown in FIG. 6 and FIG. 7) and still form a virtual scene as described with respect to FIG. 3. Thus, the pseudo-code shown in FIG. 10 is applicable to virtual scene 300 in FIG. 3.

The methods and devices described herein for providing a flexible matrix structure that will automatically adjust its dimensions as new virtual objects are added to a virtual scene defined by the matrix provide several advantages over known methods for rendering virtual scenes. For example, the flexible matrix structure does not necessarily expose the whole native application program interface with all of its complexity. Additionally, the flexible matrix structure provided encapsulates the definitions of virtual objects, thereby simplifying the construction of a three-dimensional virtual scene.

The aspects of the present invention can take the form of an entirely hardware embodiment, an entirely software embodiment or an embodiment containing both hardware and software elements. In a preferred embodiment, the aspect of the invention is implemented in software, which includes but is not limited to firmware, resident software, microcode, etc.

Furthermore, the aspect of the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of an aspect of the present invention has been presented for purposes of illustration and description, and is not intended to be exhaustive or limited to the aspects of the invention in the form disclosed. Many modifications and variations will be apparent to those of ordinary skill in the art. The embodiment was chosen and described in order to best explain the principles of the aspects of the invention, the practical application, and to enable others of ordinary skill in the art to understand the aspects of the invention for various embodiments with various modifications as are suited to the particular use contemplated.

What is claimed is:

1. A computer-implemented method of adding at least one new virtual object to a three-dimensional virtual scene having a plurality of existing virtual objects, the computer-implemented method comprising:

calculating, by a renderer program stored on a memory, dimensions for each cell in a three-dimensional array of cells forming a three-dimensional matrix that defines the three-dimensional virtual scene, wherein cells of the three-dimensional array of cells forming the three-dimensional matrix are associated with existing virtual objects of the plurality of existing virtual objects within the three-dimensional virtual scene;

receiving, during a set period of time, at least one request to add at least one new virtual object to the three-dimensional virtual scene;

propagating, by the renderer program, dimensions used to fit a largest retained virtual object along all spatial dimensions of the three-dimensional matrix, wherein the largest retained virtual object comprises a largest one of the at least one new virtual object thereby adjusting the spatial dimensions of the three-dimensional matrix to form a modified three-dimensional matrix that includes a cell associated with the largest one of the at least one new virtual object;

positioning, by the renderer program, the at least one new virtual object within the modified three-dimensional matrix; and positioning, by the renderer program, all retained existing virtual objects of the plurality of existing virtual objects within the modified three-dimensional matrix to define a modified three-dimensional virtual scene, wherein the positioning steps are performed according to an alignment rule set defined for each cell of the three-dimensional array of cells forming the modified three-dimensional matrix, and wherein the alignment rule set provides that all cells in the modified three-dimensional matrix associated with retained existing virtual objects of the plurality of existing virtual objects within the modified three-dimensional virtual scene be positioned evenly relative to each other while still accommodating the cell associated with the largest one of the at least one new virtual object, wherein all retained existing virtual objects within the modified three-dimensional virtual scene remain a same size as compared to the three-dimensional virtual scene, and a spatial relationship between the retained existing virtual objects within the modified three-dimensional virtual scene is modified as compared to the three-dimensional virtual scene.

2. The computer-implemented method of claim 1, and further comprising:

repeating the steps of calculating, receiving propagating, and positioning after receiving a further new virtual object, wherein the further new virtual object is positioned within a further modified three-dimensional virtual scene.

* * * * *